United States Patent
Andersson

(10) Patent No.: US 10,636,118 B2
(45) Date of Patent: Apr. 28, 2020

(54) INPUT SCALING TO KEEP CONTROLLER INSIDE FIELD OF VIEW

(71) Applicant: Microsoft Technology Licensing, LLC

(72) Inventor: Dan Ronny Andersson, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/017,606

(22) Filed: Jun. 25, 2018

(65) Prior Publication Data
US 2019/0392554 A1   Dec. 26, 2019

(51) Int. Cl.
*G06T 3/40* (2006.01)
*G06F 3/01* (2006.01)

(52) U.S. Cl.
CPC ............. *G06T 3/40* (2013.01); *G06F 3/011* (2013.01)

(58) Field of Classification Search
CPC .......... G02B 27/017; G02B 2027/0178; G02B 2027/014; G02B 2027/0123; G02B 2027/0138; G02B 2027/0187; G02B 27/0093; G02B 27/0172; G02B 13/0055; G02B 13/009; G02B 15/00; G02B 15/10; G02B 2027/0127; G02B 2027/0141; G02B 2027/0174; G02B 27/0101; G02B 27/0103; G02B 6/00; G02B 7/14
See application file for complete search history.

(56) References Cited

U.S. PATENT DOCUMENTS

| 8,933,884 | B2 | 1/2015 | Markovic et al. |
| 9,360,671 | B1 * | 6/2016 | Zhou ............... G02B 27/017 |
| 9,477,303 | B2 | 10/2016 | Fleischmann et al. |
| 9,645,395 | B2 * | 5/2017 | Bolas ............... G02B 27/0093 |

(Continued)

FOREIGN PATENT DOCUMENTS

EP    1837741 A2    9/2007

OTHER PUBLICATIONS

Machkovech, Sam, "Microsoft's new VR controllers will be great—until SteamVR "Knuckles" arrive", Retrieved From https://arstechnica.com/gaming/2017/05/microsofts-new-vr-controllers-will-be-great-until-steamvr-knuckles-arrive/, May 12, 2017, 7 Pages.

(Continued)

*Primary Examiner* — Devona E Faulk
*Assistant Examiner* — Ming Wu
(74) *Attorney, Agent, or Firm* — Ray Quinney & Nebeker; Tiffany Healy

(57) ABSTRACT

Methods and devices for scaling virtual movement may include receiving from a positional tracking system attached to the computer device, a current physical location of a body part of a user being tracked for providing an input to a virtual reality simulation. The methods and devices may include determining a start position based at least upon the current physical location of the user for scaling virtual movements in the virtual reality simulation corresponding to received physical movements of the user. The methods and devices may include determining a scale factor to apply to the physical movements from the start position to generate scaled virtual movements of the physical movements. The methods and devices may include transmitting the scaled virtual movement for presentation on a display.

19 Claims, 5 Drawing Sheets

(56) References Cited

U.S. PATENT DOCUMENTS

| | | |
|---|---|---|
| 9,865,089 B2 | 1/2018 | Burns et al. |
| 9,898,675 B2 | 2/2018 | Yee et al. |
| 9,904,055 B2 | 2/2018 | Burns et al. |
| 9,912,717 B2* | 3/2018 | Ha .................. G06T 19/006 |
| 2014/0201674 A1 | 7/2014 | Holz |
| 2014/0240466 A1* | 8/2014 | Holz .................. G06K 9/00355 |
| | | 348/47 |
| 2017/0262045 A1* | 9/2017 | Rouvinez ............ G06T 19/006 |
| 2017/0357332 A1 | 12/2017 | Balan et al. |
| 2018/0136744 A1 | 5/2018 | Karlsson et al. |

OTHER PUBLICATIONS

"International Search Report and Written Opinion Issued in PCT Application No. PCT/US2019/037563", dated Oct. 1, 2019, 12 Pages.

* cited by examiner

INPUT SCALING TO KEEP CONTROLLER INSIDE FIELD OF VIEW

BACKGROUND

The present disclosure relates to computer graphics systems, and more particularly, to presenting images on virtual reality (VR) devices.

In VR devices a scene produced on a display device can be oriented or modified based on user input (e.g., movement of an external controller to cause movement of the orientation of the scene, introduction of items into the scene, etc.). When wearing a VR device that tracks hands using an inside-out tracking system, tracking may get lost when the hands are not inside the device's field of view (FOV). Some hand actions will naturally bring the position of a hand outside the field of view. For example, when a user pulls back on a bow and arrow. As such, it may be difficult to simulate these types of movements.

Thus, there is a need in the art for improvements in presenting images on VR devices.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

One example implementation relates to a computer device. The computer device may include a memory to store data and instructions, a processor in communication with the memory, an operating system in communication with the memory, the processor, and an application providing a virtual reality simulation. The application may be operable to receive, from a positional tracking system attached to the computer device, a current physical location of a body part of a user being tracked for providing an input to the virtual reality simulation; determine a start position based at least upon the current physical location of the user for scaling virtual movements in the virtual reality simulation corresponding to received physical movements of the user; determine a scale factor to apply to the physical movements from the start position to generate scaled virtual movements of the physical movements; and transmit the scaled virtual movement for presentation on a display.

Another example implementation relates to a method for scaling virtual movements. The method may include receiving, by an application providing a virtual reality simulation executing on a computer device, from a positional tracking system attached to the computer device, a current physical location of a body part of a user being tracked for providing an input to the virtual reality simulation. The method may include determining a start position based at least upon the current physical location of the user for scaling virtual movements in the virtual reality simulation corresponding to received physical movements of the user. The method may include determining a scale factor to apply to the physical movements from the start position to generate scaled virtual movements of the physical movements. The method may include transmitting the scaled virtual movement for presentation on a display.

Another example implementation relates to computer-readable medium storing instructions executable by a computer device. The computer-readable medium may include at least one instruction for causing the computer device to receive, from a positional tracking system attached to the computer device, a current physical location of a body part of a user being tracked for providing an input to the virtual reality simulation. The computer-readable medium may include at least one instruction for causing the computer device to determine a start position based at least upon the current physical location of the user for scaling virtual movements in the virtual reality simulation corresponding to received physical movements of the user. The computer-readable medium may include at least one instruction for causing the computer device to determine a scale factor to apply to the physical movements from the start position to generate scaled virtual movements of the physical movements. The computer-readable medium may include at least one instruction for causing the computer device to transmit the scaled virtual movement for presentation on a display.

Additional advantages and novel features relating to implementations of the present disclosure will be set forth in part in the description that follows, and in part will become more apparent to those skilled in the art upon examination of the following or upon learning by practice thereof.

DETAILED DESCRIPTION

This disclosure relates to devices and methods for scaling virtual movements when presenting VR images using a VR device. As used herein, a VR device may include a device that generates and/or displays virtual reality images (e.g., from at least one virtual environment input), mixed reality (MR) images (e.g., from at least two virtual environment inputs), and/or augmented reality (AR) images (e.g., from at least one virtual environment input and one real environment input).

When wearing a VR device, such as a head mounted display (HMD), that tracks hands using an inside-out tracking system, tracking may get lost when the hands are not inside the device's field of view (FOV). Inside-out tracking systems may include, for example, a HMD device that includes a plurality of cameras on the HMD that may be used to track a physical position of a user while using the HMD. The plurality of cameras may have a limited field of view where the tracking system may be able to identify the physical location of the user. As such, when the user moves outside of the tracking system's field of view (e.g., the user's hands move outside the tracking system's field of view), tracking of the user may get lost.

Some actions will naturally bring the position of a hand outside the field of view. For example, when a user pulls back on a bow and arrow. Thus, it may be difficult to simulate these types of movements when the tracking system may not locate the physical location of the user.

The devices and methods may determine to start applying scaled virtual movement corresponding to the physical movements of the user, for example, when the physical movements of the user move outside of the field of view of a positional tracking system located on the computer device and/or move near the edge of the field of view of the positional tracking system. The devices and methods may determine a scale factor to apply to the physical movements of the user. The scale factor may be dependent on the type of action being performed by the user. In addition, the scale factor may be based at least upon how far the physical location of the user may be from an edge of the field of view. The scale factor may be selected so that the motion feels natural to the user while maintaining a preciseness of control when performing the action.

The devices and methods may generate scaled virtual movement based at least upon the scale factor to apply to the physical movements of the user so that the virtual movements corresponding to the physical movements of the user are scaled based upon the scale factor. By providing scaled virtual movements, the devices and methods may provide the illusion of a full physical action being performed within a virtual reality simulation, while the physical movements of the user may remain smaller within the field of view of the positional tracking system.

Figure 1:
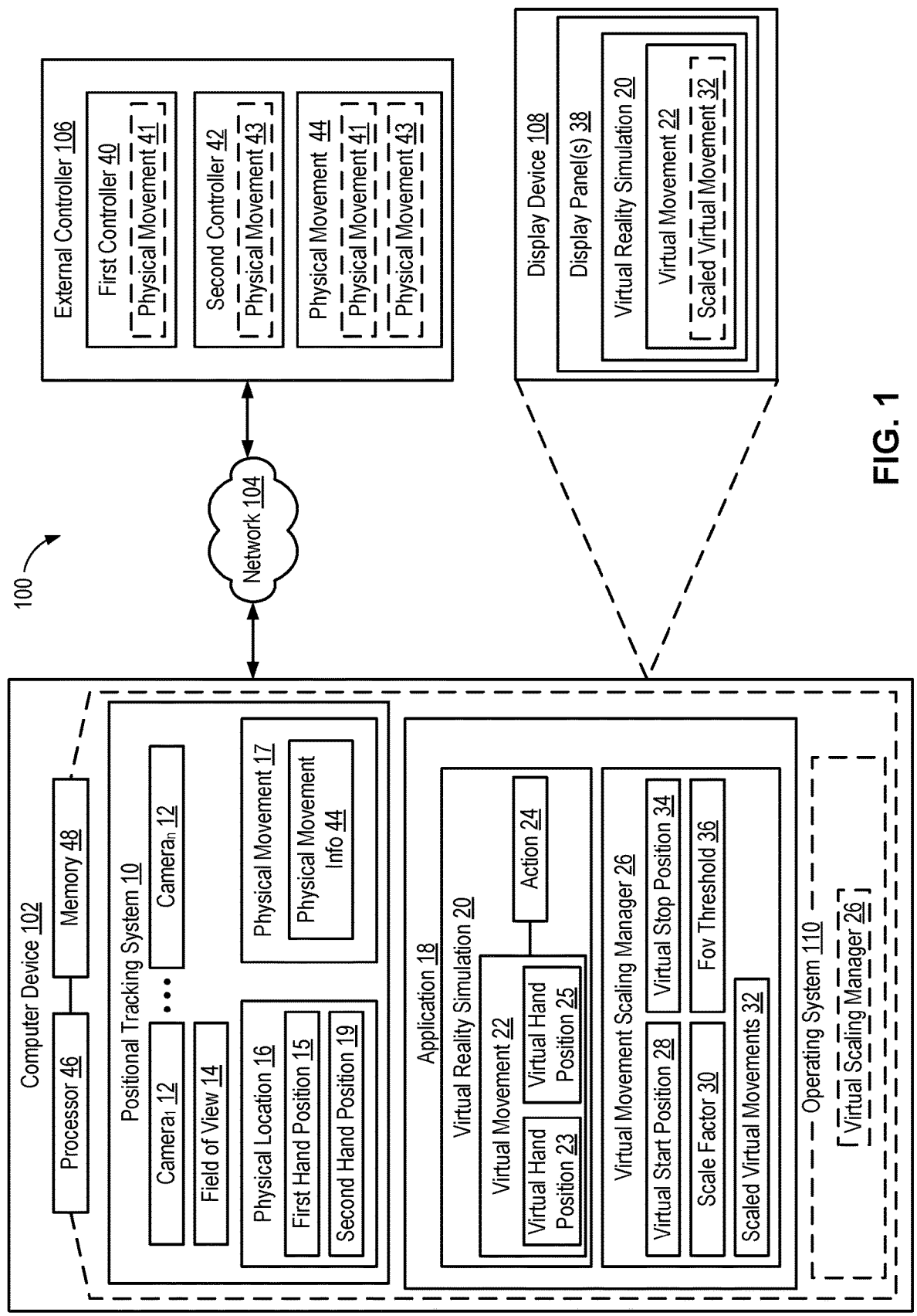
FIG. 1 is a schematic block diagram of an example computer device in accordance with an implementation of the present disclosure.
Figure 2:
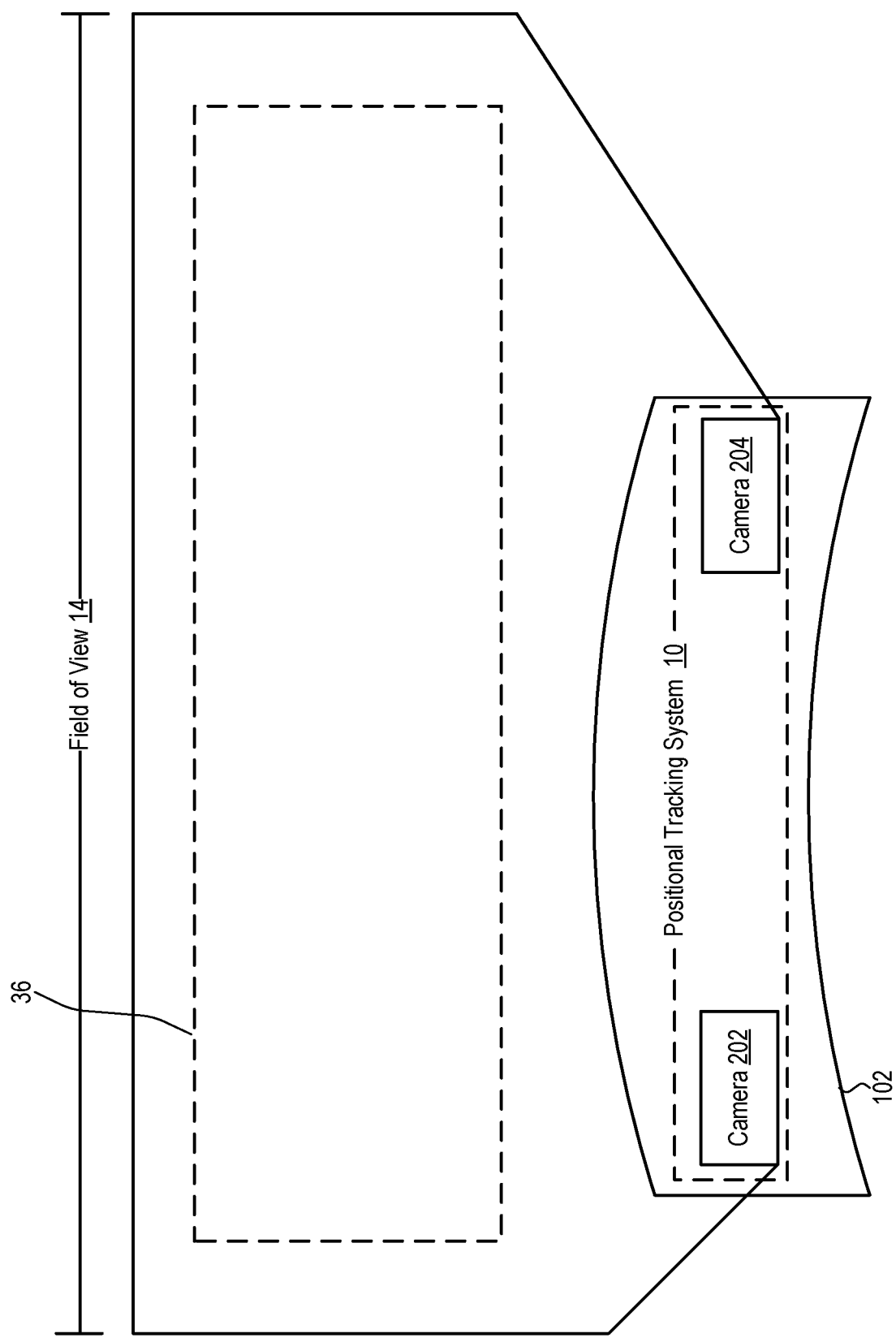
FIG. 2 is a schematic diagram of a field of view of a positional tracking system located on a head mounted display in accordance with an implementation of the present disclosure.

Referring now to FIGS. 1 and 2, an example system 100 for use in connection with scaling virtual movements when presenting VR images may include a computer device 102 in communication with one or more controllers 106. Computer device 102 may execute at least one application 18 to run a virtual reality simulation 20, which generates and communicates image data for displaying one or more VR images defining one or more scenes of the virtual reality simulation 20 on display device 108. Display device 108 may include, for example, a head mounted display (HMD) device, and may have one or more display panels 38 (e.g., light emitting diode (LED), organic LED (OLED), liquid crystal display (LCD), etc.) capable of outputting display frame(s) of the virtual reality simulation 20 for viewing by a user of system 100.

Computer device 102 may communicate with the one or more controllers 106, such as a first controller 40 and/or a second controller 42, via network 104 and/or through a wired or wireless connection to obtain physical movement 44 input of the user of system 100 to use in the virtual reality simulation 20. External controllers 106 may include, but are not limited to, a gamepad, a joystick, keyboard, mouse, or other input device that may provide physical movement 44 input that may correspond to virtual movements 22 in a virtual environment, such as a game or a virtual world, of the virtual reality simulation 20.

In an implementation, the first controller 40 may provide physical movement 41 input of a right hand of the user and the second controller 42 may provide physical movement 43 input of a left hand of the user. Another implementation may include the first controller 40 may provide physical movement 41 input of a first user and the second controller 42 may provide physical movement 43 input of a second user. The virtual movement 22 displayed in the virtual reality simulation 20 may correspond to the received physical movement 44 input of users of system 100 from the one or more controllers 106. For example, the virtual movement 22 may correspond to the physical movement 41 input of the first controller 40 and/or the physical movement 43 input of the second controller 42.

Computer device 102 may include a positional tracking system 10 located on computer device 102 that may determine a physical location 16 of the user and/or may be used to determine the physical movements 17 of the user. Positional tracking system 10 may include, but is not limited to, one or more sensors (e.g., cameras), emitters (e.g., IR LEDs), inertial devices (accelerometer and/or gyroscope), and/or any other position sensing system capable of detecting an orientation, position, and/or movement of a user of system 100. For instance, in an "inside-out" implementation, positional tracking system 10 may include but is not limited to one or more depth cameras 12 (up to n, where n is an integer) and one or more inertial measurement units (IMUs), tracking software, a simultaneous localization and mapping algorithm, and one or more processors that aid positional tracking system 10 in determining the physical location 16 of the user and/or the physical movements 17 of the user.

The physical location 16 of the user may include, but is not limited to, a current first hand position 15 and/or a current second hand position 19 of the user. For example, such current positions may be in a local coordinate system associated with the computer device 102 and/or positional tracking system 10. In some cases, such a local coordinate system may correspond to or the same as a global coordinate system, such as with a geographic positioning system. In an implementation, the current first hand position 15 may correspond to a physical location of the first controller 40 and the current second hand position 19 may correspond to a physical location of the second controller 42.

In addition, positional tracking system 10 may use the physical movement 44 input of the external controllers 106 in determining the physical movement 17 of the user. For example, positional tracking system 10 may have a corresponding field of view 14 where the one or more cameras 12 may track the physical movement 41, 43 of the first controller 40 and/or the second controller 42. As such, when a user moves a first controller 40 and/or a second controller 42 within the field of view 14 of the positional tracking system 10, positional tracking system 10 may be able to determine the current first hand position 15 and/or the current second hand position 19 of the user by tracking the physical movements 41, 43 of the first controller 40 and/or the second controller 42.

Positional tracking system 10 may transmit the detected and/or tracked physical location 16 of the user to application 18. In addition, positional tracking system 10 may transmit the tracked physical movements 17 of the user to application 18. Application 18 may translate the physical movements 17 of the user into virtual movements 22 within the virtual reality simulation 20. For example, application 18 may determine a virtual first hand position 23 and/or a virtual second hand position 25 based at lease upon the physical location 16 of the user (e.g., the current first hand position 15 and/or the current second hand position 19 of the user). Moreover, application 18 may correlate the virtual movements 22 with the physical movements 17 of the user. As such, as a user performs an action 24 in the virtual reality simulation 20, the physical movements 17 of the user may be translated into virtual movements 22 to perform the action 24.

Computer device 102 may include an operating system 110 executed by processor 46 and/or memory 48. Memory 48 of computer device 102 may be configured for storing data and/or computer-executable instructions defining and/or associated with operating system 110, and processor 46 may execute such data and/or instructions to instantiate operating system 110. An example of memory 48 can include, but is not limited to, a type of memory usable by a computer, such as random access memory (RAM), read only memory (ROM), tapes, magnetic discs, optical discs, volatile memory, non-volatile memory, and any combination thereof. An example of processor 46 can include, but is not limited to, any processor specially programmed as described herein, including a controller, microcontroller, application specific integrated circuit (ASIC), field programmable gate array (FPGA), system on chip (SoC), or other programmable logic or state machine.

Computer device 102 may include any mobile or fixed computer device, which may be connectable to a network. Computer device 102 may be, for example, a computer device such as a desktop or laptop or tablet computer, a cellular telephone, a gaming device, a mixed reality or virtual reality device, a music device, a television, a navigation system, a camera, a personal digital assistant (PDA), or a handheld device, or any other computer device having wired and/or wireless connection capability with one or more other devices and/or communication networks.

Application 18 and/or operating system 110 may include a virtual movement scaling manager 26 operable to determine whether to start applying scaled virtual movement 32 corresponding to the physical movements 17 of the user. For example, when the user's physical movements 17 move outside of the field of view 14 of positional tracking system 10, tracking of the user's physical movements 17 may get lost (e.g., positional tracking system 10 may not be able to determine the physical movements 17 of the user). As such, virtual movement scaling manager 26 may determine to start applying scaled virtual movement 32 corresponding to the user's physical movements 17 so that the physical movements 17 of the user may remain within the field of view 14 of positional tracking system 10.

Some hand actions may naturally bring the position of a hand outside the field of view 14 of positional tracking system 10. For example, when a user pulls back on a bow and arrow and/or moves objects near the edge of the field of view 14, the user's hands may move outside the field of view 14. Thus, it may be difficult to simulate these types of movements in the virtual reality simulation 20, e.g., based on tracking actual physical position, when positional tracking system 10 may not locate the physical location 16 and/or the physical movements 17 of the user. As such, virtual movement scaling manager 26 may determine to start scaling the physical movements of the user. For example, the scaling of the physical movements of the user may be based on a known or predicted motion and/or action.

Virtual movement scaling manager 26 may also determine to start to start applying scaled virtual movement 32 corresponding to the physical movements 17 of the user based at least upon an action 24 being performed in the virtual reality simulation 20. For example, when a user is performing an action 24 that may bring the user's hand outside the field of view 14, virtual movement scaling manager 26 may determine to start scaling the physical movements of the user at the start of the action 24. In an implementation, various actions 24 may be associated with metadata that may indicate whether the actions 24 may move the physical movements 17 of the user outside of the field of view 14 of positional tracking system 10. For example, when the metadata indicates that the action 24 may move the physical movements 17 of the user outside of the field of view 14, virtual movement scaling manager 26 may determine to start applying scaled virtual movement 32 corresponding to the physical movements 17 of the user.

Virtual movement scaling manager 26 may match data from a current action 24 being performed by a user in the virtual reality simulation 20 with data from known actions to determine the action 24 being performed by the user. For example, the application 18 and/or game may identify actions 24 that the user may be performing in the virtual reality simulation 20 based at least upon the user's physical movements 17.

One example use case may include an action 24 of pulling back on a bow and arrow. When the user loads the bow on the arrow, virtual movement scaling manager 26 may determine to start scaling the physical movements 17 of the user. Another example use case may include an action 24 of throwing a ball. When the user starts to throw the ball, virtual movement scaling manager 26 may determine to start scaling the physical movements 17 of the user. Another example use case may include an action 24 of moving large objects in the virtual reality simulation 20. When a user starts to move the large objects, virtual movement scaling manager 26 may determine to start scaling the physical movements 17 of the user associated with the identified action 24.

Virtual movement scaling manager 26 may also determine to start scaling the physical movements 17 of the user when the physical location 16 of the user is near and/or approaching an edge of the field of view 14 during the identified action 24. In an implementation, a field of view threshold 36 may identify when the physical movements 17 and/or the physical location 16 of the user is near and/or approaching an edge of the field of view 14. For example, when the hand movements of the user crosses the field of view threshold 36 (e.g., a user's hand moves close to the user's head), virtual movement scaling manager 26 may start scaling the physical movements 17 of the user.

Referring now to FIG. 2, illustrated is an example field of view 14 of positional tracking system 10 of computer device 102. For example, positional tracking system 10 may include two cameras 202, 204. Cameras 202, 204 may have a corresponding field of view 14 where cameras 202, 204 may detect and/or track the physical movements 17 (FIG. 1) of the user. As such, the physical movements 17 of the user within the field of view 14 of cameras 202, 204 may be tracked by positional tracking system 10.

In an implementation, there may be a field of view threshold 36 a predetermined distance from the edge of the field of view 14. When the physical location 16 (FIG. 1) of the user moves across the field of view threshold 36, virtual movement scaling manager 26 (FIG. 1) may determine to start scaling the physical movements of the user.

Referring back to FIG. 1, when virtual movement scaling manager 26 determines to start scaling the physical movement 17 of the user, virtual movement scaling manager 26 may determine a virtual start position 28 to start the scaling of the physical movement 17 of the user. The virtual start position 28 may correspond to the current physical location 16 of the user (e.g., the current first hand position 15 and/or the current second hand position 19 of the user).

In addition, virtual movement scaling manager 26 may determine a scale factor 30 to apply to the physical movement 17 of the user in association with the action 24. The scale factor 30 may be dependent on the type of action 24 being performed by the user. In addition, the scale factor 30 may be based at least upon how far the physical location 16 of the user is from an edge of the field of view 14. The scale factor 30 may be selected so that the motion feels natural to the user while maintaining a preciseness of control when performing the action 24.

Virtual movement scaling manager 26 may generate scaled virtual movement 32 based at least upon the scale factor 30 to apply to the physical movement 17 of the user so that the virtual movement 22 corresponding to the physical movements 17 of the user are scaled based upon the scale factor 30. As such, the user may maintain the illusion of the correct virtual movement 22 occurring while using smaller physical motions to remain within in the field of view 14 of the positional tracking system 10.

For example, when a user shoots a bow and arrow in the virtual reality simulation 20, virtual movement scaling manager 26 may determine to start applying scaled virtual movement 32 to the user's physical movements 17. Virtual movement scaling manager 26 may determine a virtual start position 28 for the scaled virtual movement 32 of when the user first puts the arrow on the string of the bow. Virtual movement scaling manager 26 may also determine the scale factor 30 to be 130% of any physical movements of the user. As such, the visual representation of the scaled virtual movement 32 may be 130% larger than the actual movements in the physical world so that the user only moves 70% of the way in the real world to shoot the bow and arrow, staying inside the field of view 14, while allowing the visual representation of the hand and the start of the arrow to align next to the side of the user's head, which may be outside the field of view 14 of positional tracking system 10.

Virtual movement scaling manager 26 may adjust the scale factor 30 during the performance of the action 24. For example, if a user physical movements 17 move further away from the edge of the field of view 14, virtual movement scaling manager 26 may decrease the scale factor 30, reducing the scaled virtual movement 32. In addition, if a user physical movements 17 move closer to the edge of the field of view 14, virtual movement scaling manager 26 may increase the scale factor 30, increasing the scaled virtual movement 32. As such, the scale factor 30 may be adjusted during the performance of the action 24.

Virtual movement scaling manager 26 may transmit the scaled virtual movement 32 to display device 108 for presentation on the display panels 38 within the virtual reality simulation 20. As such, the scaled virtual movement 32 may provide the user the illusion of the correct virtual movement 22 occurring while using smaller physical motions to remain within in the field of view 14 of the positional tracking system 10.

Virtual movement scaling manager 26 may determine a virtual stop position 34 for the scaled virtual movement 32. The virtual stop position 34 may correspond to the physical location 16 of the user upon completion of action 24. For example, when the user finishes shooting the arrow, virtual movement scaling manager 26 may determine the virtual stop position 34 for the scaled virtual movement 32.

When the scaled virtual movement 32 stops, application 18 may resume correlating the virtual movement 22 to the physical movements 17 of the user without scaling the virtual movement 22. For example, the virtual movement 22 may be a 1 to 1 correlation with the physical movement 17 of the user. As such, application 18 may transmit the virtual movement 22 to display device 108 for presentation on the display panels 38 within the virtual reality simulation 20.

By providing scaled virtual movements 32, system 100 may provide the illusion of a full action being performed within a virtual reality simulation 20, while the physical movements of the user may remain smaller within the field of view 14 of the positional tracking system 10.

Figure 3:
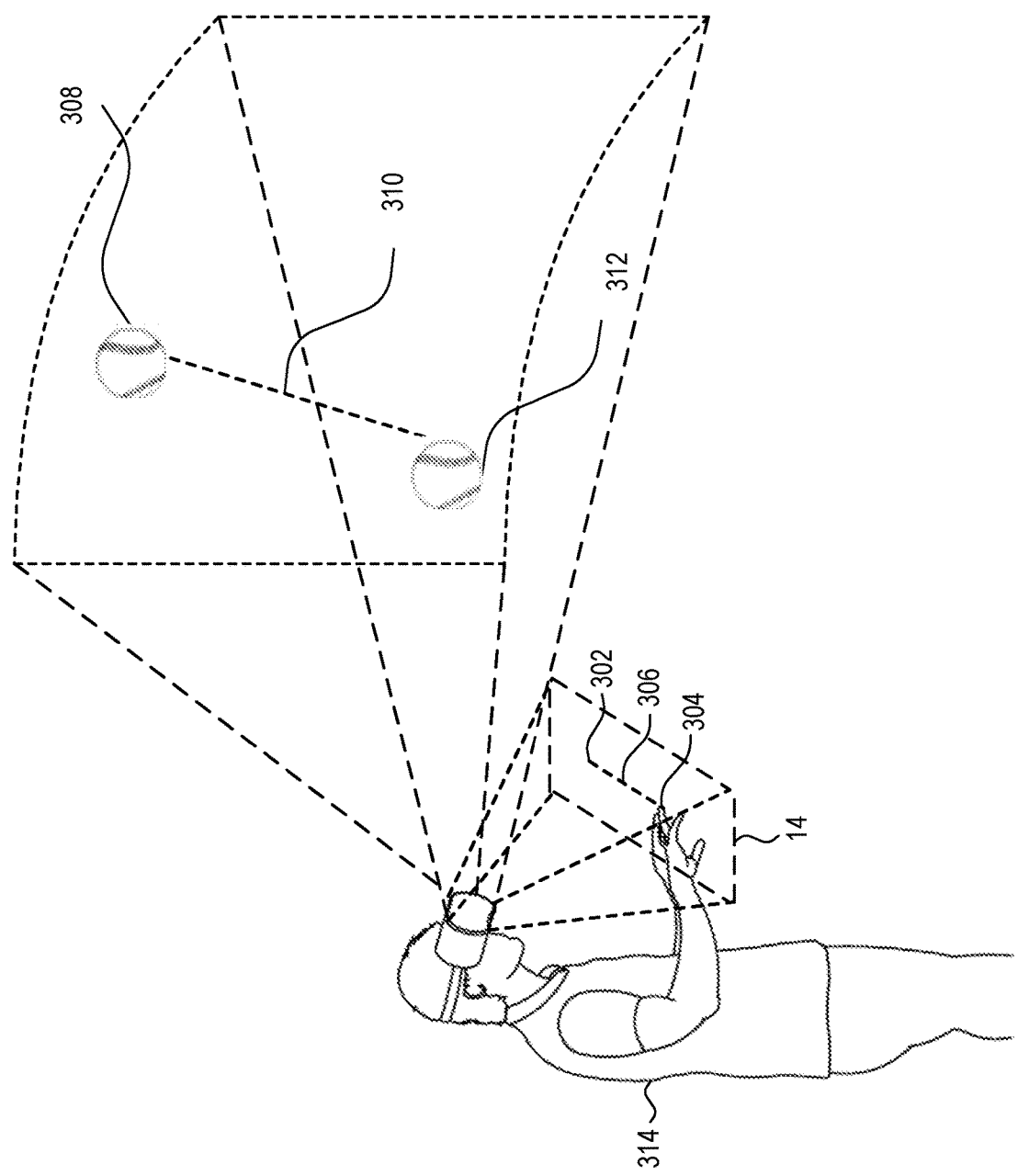
FIG. 3 is a schematic diagram of a virtual reality simulation with scaled virtual movement in accordance with an implementation of the present disclosure.

Referring now to FIG. 3, an example of a virtual reality simulation 20 with scaled virtual movement 310 for use with computer device 102 (FIG. 1) is illustrated. A user 314 may move their hands within the field of view 14 of the positional tracking system 10 (FIG. 1) to throw a baseball within the virtual reality simulation 20. When the throws down the baseball in the virtual reality simulation 20, the physical location 302 of the user may correspond to the starting position 308 in the virtual reality simulation 20 of where the baseball was picked up.

In an implementation, throwing a baseball may be an action previously identified as an action where the physical movements of the user may move outside the field of view 14 of the positional tracking system 10 (e.g., a user may bring their hands close to and/or behind their head to throw the baseball). As such, the virtual movement scaling manager 26 (FIG. 1) may determine to start scaling the physical movements of the user when the user picks up the baseball in the virtual reality simulation 20.

Virtual movement scaling manager 26 may determine a virtual start position 308 to start the scaling of the physical movements of the user to throw the baseball. The virtual start position 308 may correspond to the current physical location 302 of the user when the user picked up the baseball. Virtual movement scaling manager 26 may generate scaled virtual movement 310 of the physical movement 306 of the user so that the scaled virtual movement 310 is greater than the actual physical movement 306 of the user.

Virtual movement scaling manager 26 may transmit the scaled virtual movement 310 to display device 108 (FIG. 1) for presentation within the virtual reality simulation 20 so that when a user pulls back the baseball to throw in the virtual reality simulation 20 (e.g., at physical location 302), the user may achieve the action of throwing the baseball by making smaller physical motions (e.g., moving to physical location 304) while remaining in the field of view 14 of the positional tracking system 10. As such, the user may maintain the illusion of the correct virtual movement 22 occurring (e.g., the baseball moving far back in the virtual reality simulation 20 to throw the baseball), while using smaller physical movements 306 to remain within in the field of view 14 of the positional tracking system 10.

Figure 4:
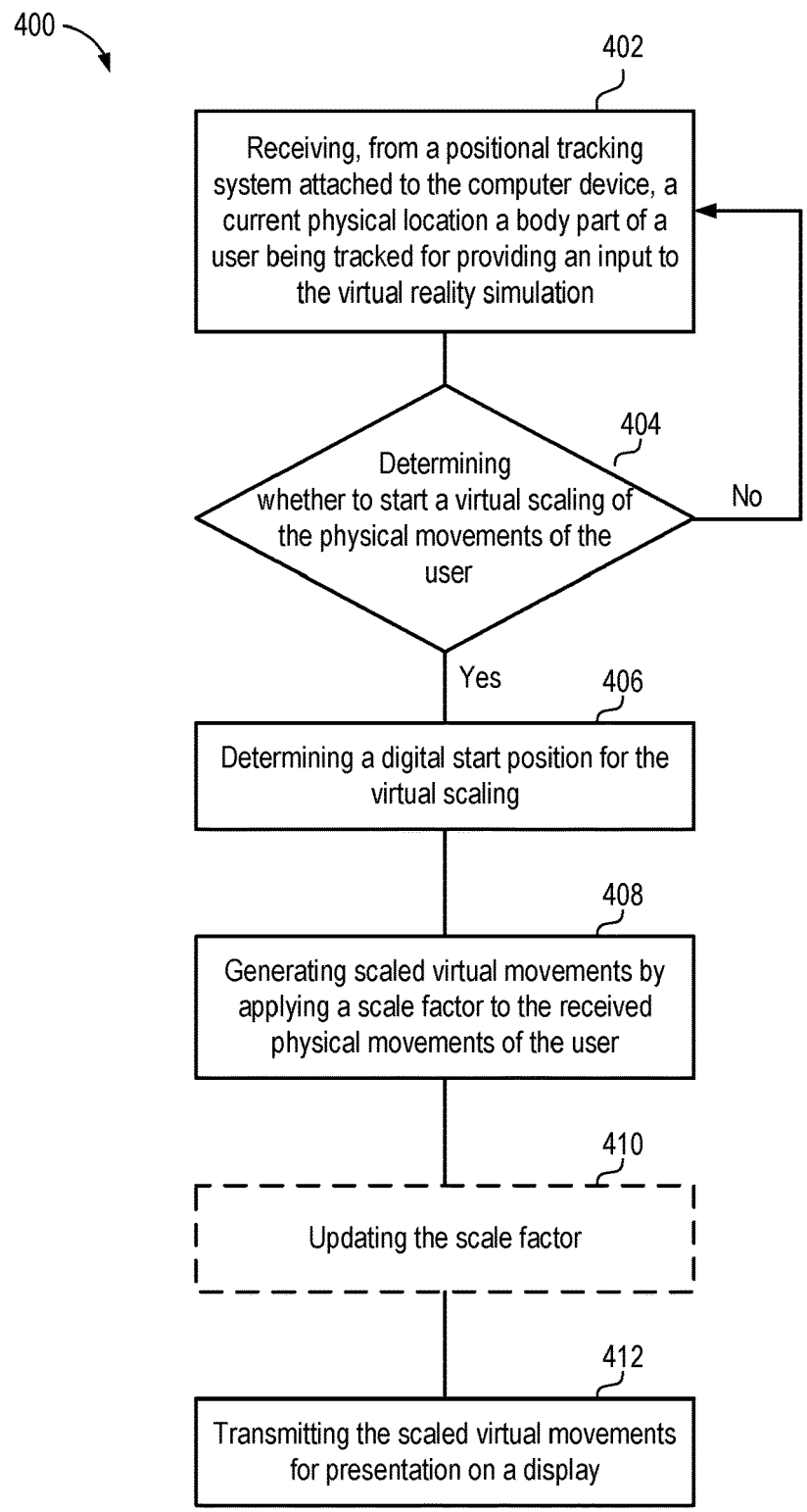
FIG. 4 is a flow chart of a method for scaling virtual movements in accordance with an implementation of the present disclosure.

Referring now to FIG. 4, a method flow 400 for scaling virtual movements for use with application 18 (FIG. 1) by computer device 102 (FIG. 1) is discussed in connection with the description of the architecture of FIG. 1.

At 402, method 400 may include receiving, from a positional tracking system attached to the computer device, a current physical location of a body part of a user being tracked for providing an input to the virtual reality simulation. A positional tracking system 10 located on computer device 102 may determine a physical location 16. The physical location 16 of the user may include, but is not limited to, a current first hand position 15 and/or a current second hand position 19 of the user. For example, such current positions may be in a local coordinate system associated with the computer device 102 and/or positional tracking system 10. In some cases, such a local coordinate system may correspond to or the same as a global coordinate system, such as with a geographic positioning system. In an implementation, the current first hand position 15 may correspond to a physical location of the first controller 40 and the current second hand position 19 may correspond to a physical location of the second controller 42.

Positional tracking system 10 may include but is not limited to one or more depth cameras 12 (up to n, where n is an integer) and one or more inertial measurement units (IMUs), tracking software, a simultaneous localization and mapping algorithm, and one or more processors that aid positional tracking system 10 in determining the physical location 16 of the user and/or the physical movements 17 of the user.

Positional tracking system 10 may transmit the detected and/or tracked physical location 16 of the user to application 18. In addition, positional tracking system 10 may transmit the tracked physical movements 17 of the user to application 18. Application 18 may translate the physical movements 17 of the user into virtual movements 22 within the virtual reality simulation 20. For example, application 18 may determine a virtual first hand position 23 and/or a virtual second hand position 25 based at lease upon the physical location 16 of the user (e.g., the current first hand position 15 and/or the current second hand position 19 of the user). Moreover, application 18 may correlate the virtual movements 22 with the physical movements 17 of the user. As such, as a user performs an action 24 in the virtual reality simulation 20, the physical movements 17 of the user may be translated into virtual movements 22 to perform the action 24.

At 404, method 400 may include determining whether to start a virtual scaling of the physical movements of the user. Application 18 and/or operating system 110 may include a virtual movement scaling manager 26 operable to determine whether to start applying scaled virtual movement 32 in the virtual reality simulation 20 corresponding to the physical movements 17 of the user. For example, when the user's physical movements 17 move outside of the field of view 14 of positional tracking system 10, tracking of the user's physical movements 17 may get lost (e.g., positional tracking system 10 may not be able to determine the physical movements 17 of the user). As such, virtual movement scaling manager 26 may determine to start applying scaled virtual movement 32 corresponding to the user's physical movements 17 so that the physical movements 17 of the user may remain within the field of view 14 of positional tracking system 10.

Virtual movement scaling manager 26 may also determine to start to start applying scaled virtual movement 32 in the virtual reality simulation 20 corresponding to the physical movements 17 of the user based at least upon an action 24 being performed in the virtual reality simulation 20. For example, when a user is performing an action 24 that may bring the user's hand outside the field of view 14, virtual movement scaling manager 26 may determine to start scaling the physical movements of the user at the start of the action 24. In an implementation, various actions 24 may be associated with metadata that may indicate whether the actions 24 may move the physical movements 17 of the user outside of the field of view 14 of positional tracking system 10.

Virtual movement scaling manager 26 may also determine to start scaling the physical movements 17 of the user when the physical location 16 of the user is near and/or approaching an edge of the field of view 14 during the identified action 24. In an implementation, a field of view threshold 36 may identify when the physical movements 17 and/or the physical location 16 of the user is near and/or approaching an edge of the field of view 14. For example, when the hand movements of the user crosses the field of view threshold 36 (e.g., a user's hand moves close to the user's head), virtual movement scaling manager 26 may start scaling the physical movements 17 of the user.

At 406, method 400 may include determining a digital start position for the virtual scaling. When virtual movement scaling manager 26 determines to start scaling the physical movement 17 of the user, virtual movement scaling manager 26 may determine a virtual start position 28 to start the scaling of the physical movement 17 of the user. The virtual start position 28 may correspond to the current physical location 16 of the user.

In addition, virtual movement scaling manager 26 may determine a scale factor 30 to apply to the physical movement 17 of the user. The scale factor 30 may be dependent on the type of action 24 being performed by the user in association with the action 24. In addition, the scale factor 30 may be based at least upon how far the physical location 16 of the user is from an edge of the field of view 14. The scale factor 30 may be selected so that the motion feels natural to the user while maintaining a preciseness of control when performing the action 24.

At 408, method 400 may include generating scaled virtual movements by applying a scale factor to the received physical movements of the user. Virtual movement scaling manager 26 may generate scaled virtual movement 32 based at least upon the scale factor 30 to apply to the physical movement 17 of the user so that the virtual movement 22 corresponding to the physical movements 17 of the user are scaled based upon the scale factor 30. An example scale factor 30 may include a 2 to 1 scaling. As such, the generated scaled virtual movements 32 may be twice the size of the physical movements 17 of the user. As such, the user may maintain the illusion of the correct virtual movement 22 occurring while using smaller physical motions to remain within in the field of view 14 of the positional tracking system 10.

At 410, method 400 may optionally include updating the scale factor. Virtual movement scaling manager 26 may adjust the scale factor 30 during the performance of the action 24. For example, if a user physical movements 17 move further away from the edge of the field of view 14, virtual movement scaling manager 26 may decrease the scale factor 30, reducing the scaled virtual movement 32. In addition, if a user physical movements 17 move closer to the edge of the field of view 14, virtual movement scaling manager 26 may increase the scale factor 30, increasing the scaled virtual movement 32. As such, the scale factor 30 may be adjusted during the performance of the action 24.

At 412, method 400 may include transmitting the scaled virtual movements for presentation on a display. Virtual movement scaling manager 26 may transmit the scaled virtual movement 32 to display device 108 for presentation on the display panels 38 within the virtual reality simulation 20.

Virtual movement scaling manager 26 may determine a virtual stop position 34 for the scaled virtual movement 32. The virtual stop position 34 may correspond to the physical location 16 of the user upon completion of action 24. When the scaled virtual movement 32 stops, application 18 may resume correlating the virtual movement 22 to the physical movements 17 of the user without scaling the virtual movement 22. For example, the virtual movement 22 may be a 1 to 1 correlation with the physical movement 17 of the user. As such, application 18 may transmit the virtual movement 22 to display device 108 for presentation on the display panels 38 within the virtual reality simulation 20.

By providing scaled virtual movements, method 400 may provide the illusion of a full physical action being performed within a virtual reality simulation, while the physical movements of the user may remain smaller within the field of view of the positional tracking system.

Figure 5:
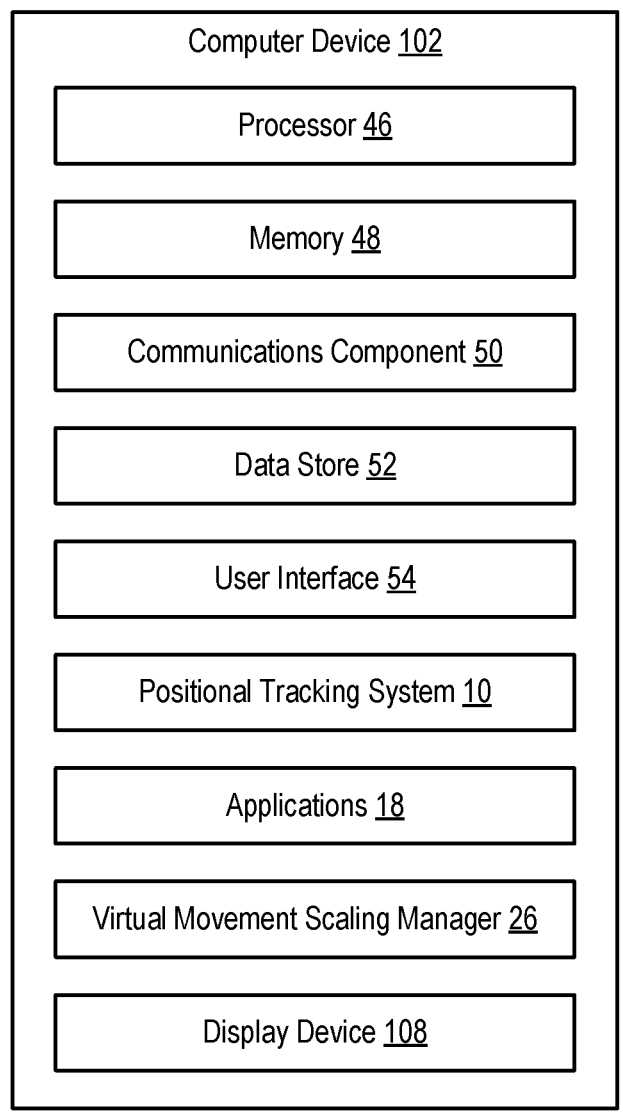
FIG. 5 is a schematic block diagram of an example device in accordance with an implementation of the present disclosure.

Referring now to FIG. 5, illustrated is an example computer device 102 in accordance with an implementation, including additional component details as compared to FIG. 1. In one example, computer device 102 may include processor 46 for carrying out processing functions associated with one or more of components and functions described herein. Processor 46 can include a single or multiple set of processors or multi-core processors. Moreover, processor 46 can be implemented as an integrated processing system and/or a distributed processing system.

Computer device 102 may further include memory 48, such as for storing local versions of applications being executed by processor 46. Memory 48 can include a type of memory usable by a computer, such as random access memory (RAM), read only memory (ROM), tapes, magnetic discs, optical discs, volatile memory, non-volatile memory, and any combination thereof. Additionally, processor 46 and memory 48 may include and execute operating system 110 (FIG. 1).

Further, computer device 102 may include a communications component 50 that provides for establishing and maintaining communications with one or more parties utilizing hardware, software, and services as described herein. Communications component 50 may carry communications between components on computer device 102, as well as between computer device 102 and external devices, such as devices located across a communications network and/or devices serially or locally connected to computer device 102. For example, communications component 50 may include one or more buses, and may further include transmit chain components and receive chain components associated with a transmitter and receiver, respectively, operable for interfacing with external devices.

Additionally, computer device 102 may include a data store 52, which can be any suitable combination of hardware and/or software, that provides for mass storage of information, databases, and programs employed in connection with implementations described herein. For example, data store 52 may be a data repository for positional tracking system 10 (FIG. 1), applications 18 (FIG. 1), virtual movement scaling manager 26 (FIG. 1), and/or display device 108 (FIG. 1).

Computer device 102 may also include a user interface component 54 operable to receive inputs from a user of computer device 102 and further operable to generate outputs for presentation to the user. User interface component 54 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 54 may include one or more output devices, including but not limited to a display, a speaker, a haptic feedback mechanism, a printer, any other mechanism capable of presenting an output to a user, or any combination thereof.

In an implementation, user interface component 54 may transmit and/or receive messages corresponding to the operation of positional tracking system 10, applications 18, virtual movement scaling manager 26, and/or display device 108. In addition, processor 46 executes positional tracking system 10, applications 18, virtual movement scaling manager 26, and/or display device 108, and memory 48 or data store 52 may store them.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computer device and the computer device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various implementations or features may have been presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computer devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or algorithm described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some implementations, the processor and the storage medium may reside in an ASIC. Additionally, the ASIC may reside in a user terminal. In the alternative, the processor and the storage medium may reside as discrete components in a user terminal. Additionally, in some implementations, the steps and/or actions of a method or algorithm may reside as one or any combination or set of codes and/or instructions on a machine readable medium and/or computer readable medium, which may be incorporated into a computer program product.

In one or more implementations, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While implementations of the present disclosure have been described in connection with examples thereof, it will be understood by those skilled in the art that variations and modifications of the implementations described above may be made without departing from the scope hereof. Other implementations will be apparent to those skilled in the art from a consideration of the specification or from a practice in accordance with examples disclosed herein.

What is claimed is:

1. A computer device, comprising:
   a memory to store data and instructions;
   a processor in communication with the memory;
   an operating system in communication with the memory, the processor, and an application providing a virtual reality simulation, wherein the application is operable to:
      receive, from a positional tracking system attached to the computer device, a current physical location of a body part of a user being tracked for providing an input to the virtual reality simulation;
      determine a start position based at least upon the current physical location of the user for scaling virtual movements in the virtual reality simulation corresponding to received physical movements of the user;
      determine a scale factor to apply to the physical movements from the start position to generate scaled virtual movements of the physical movements, wherein the scaled virtual movements simulate an action with a range of motion that exceeds a field of view of the positional tracking system while using smaller physical movements within the field of view of the positional tracking system to perform the action; and
      transmit the scaled virtual movements for presentation on a display.

2. The computer device of claim 1, wherein the application is further operable to display the scaled virtual movements on the display.

3. The computer device of claim 1, wherein the application is further operable to determine a stop position for the scaled virtual movements corresponding to a completion of an action being performed by the user.

4. The computer device of claim 3, wherein the application is further operable to resume correlating virtual movement to the physical movements of the user without scaling the virtual movement.

5. The computer device of claim 1, wherein the application is further operable to determine to start the scaling of the virtual movements based at least upon an action being performed by the user.

6. The computer device of claim 1, wherein the application is further operable to determine to start the scaling of the virtual movements based at least upon a distance of the current physical location from an edge of a field of view of the positional tracking system.

7. The computer device of claim 1, wherein the application is further operable to adjust the scale factor used to generate the scaled virtual movements of the physical movements.

8. The computer device of claim 1, wherein the positional tracking system includes at least one camera with a corresponding field of view.

9. The computer device of claim 1, wherein the positional tracking system tracks the physical movements of the user within the field of view.

10. A method for scaling virtual movements, comprising:
    receiving, by an application providing a virtual reality simulation executing on a computer device, from a positional tracking system attached to the computer device, a current physical location of a body part of a user being tracked for providing an input to the virtual reality simulation;
    determining a start position based at least upon the current physical location of the user for scaling virtual movements in the virtual reality simulation corresponding to received physical movements of the user;
    determining a scale factor to apply to the physical movements from the start position to generate scaled virtual movements of the physical movements, wherein the scaled virtual movements simulate an action with a range of motion that exceeds a field of view of the positional tracking system while using smaller physical movements within the field of view of the positional tracking system to perform the action; and
    transmitting the scaled virtual movements for presentation on a display.

11. The method of claim 10, further comprising:
    displaying the scaled virtual movements on the display.

12. The method of claim 10, further comprising:
    determining a stop position for the scaled virtual movements corresponding to a completion of an action being performed by the user.

13. The method of claim 12, further comprising:
resuming correlating virtual movement to the physical movements of the user without scaling the virtual movement.

14. The method of claim 10, further comprising:
determining to start the scaling of the virtual movements based at least upon an action being performed by the user.

15. The method of claim 10, further comprising:
determining to start the scaling of the virtual movements based at least upon a distance of the current physical location from an edge of a field of view of the positional tracking system.

16. The method of claim 10, further comprising:
adjusting the scale factor used to generate the scaled virtual movements of the physical movements.

17. The method of claim 10, wherein the positional tracking system includes at least one camera with a corresponding field of view.

18. The method of claim 10, wherein the positional tracking system tracks the physical movements of the user within the field of view.

19. A non-transitory computer-readable medium storing instructions executable by a computer device, comprising:

at least one instruction for causing the computer device to receive, from a positional tracking system attached to the computer device, a current physical location of a body part of a user being tracked for providing an input to a virtual reality simulation;

at least one instruction for causing the computer device to determine a start position based at least upon the current physical location of the user for scaling virtual movements in the virtual reality simulation corresponding to received physical movements of the user;

at least one instruction for causing the computer device to determine a scale factor to apply to the physical movements from the start position to generate scaled virtual movements of the physical movements, wherein the scaled virtual movements simulate an action with a range of motion that exceeds a field of view of the positional tracking system while using smaller physical movements within the field of view of the positional tracking system to perform the action; and at least one instruction for causing the computer device to transmit the scaled virtual movements for presentation on a display.

* * * * *